Dec. 6, 1932.　　　　J. ROBINSON　　　　1,890,096
AUTOMATIC TRAIN PIPE CONNECTER LOCK
Original Filed Sept. 10, 1928　　2 Sheets-Sheet 1
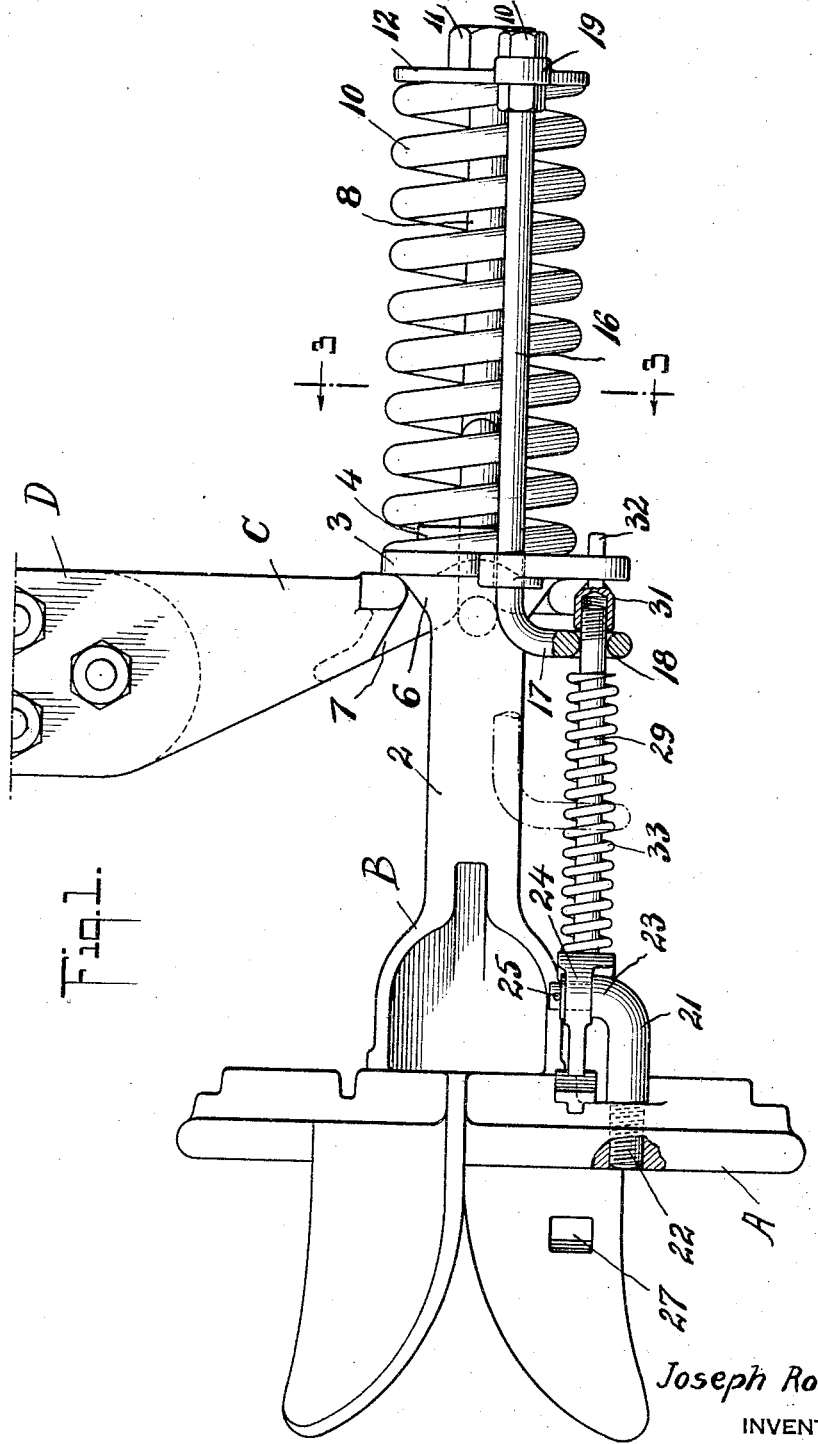
Joseph Robinson.
INVENTOR
BY Robt H Robb
ATTORNEY

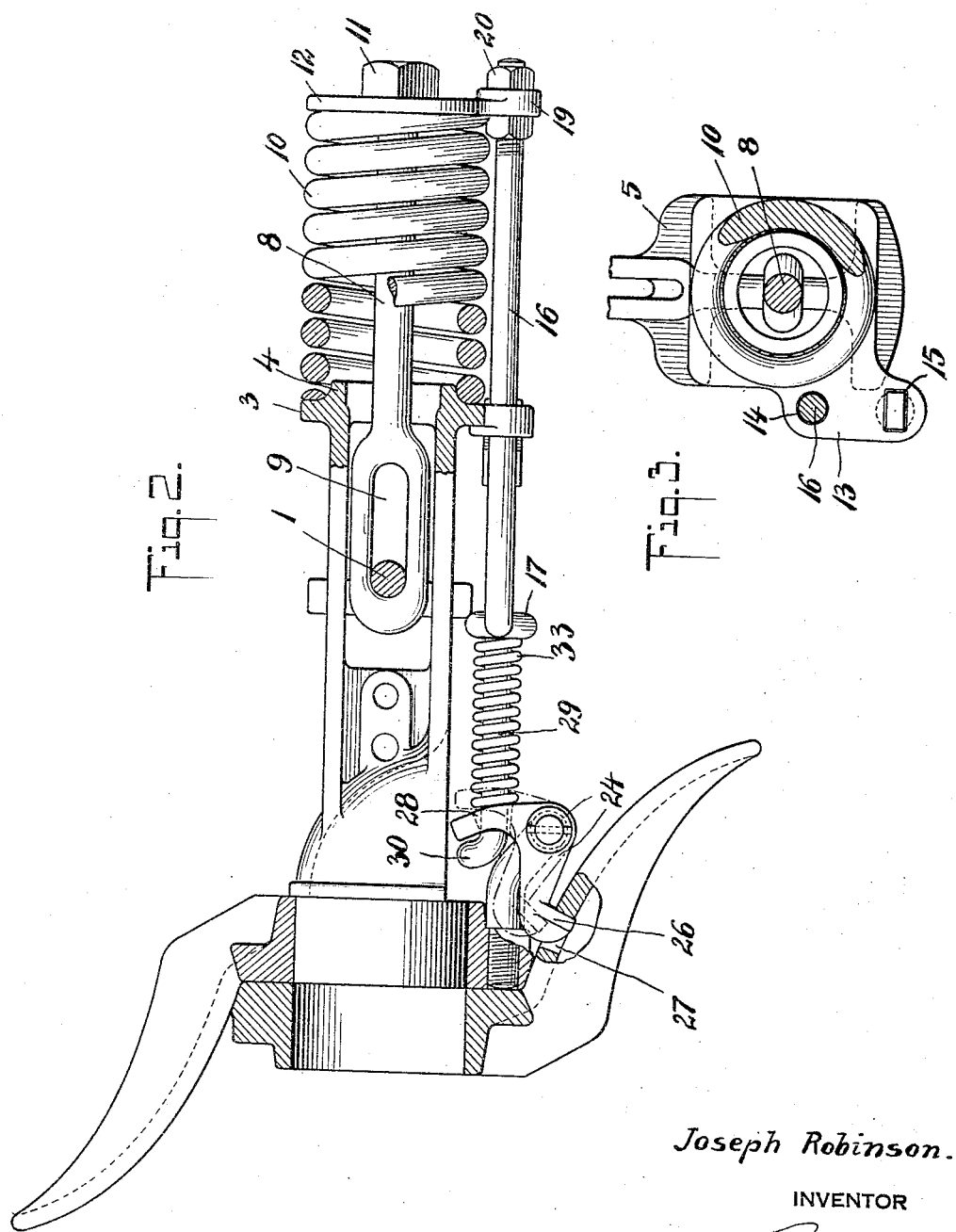

Patented Dec. 6, 1932

1,890,096

UNITED STATES PATENT OFFICE

JOSEPH ROBINSON, OF NEW YORK, N. Y.

AUTOMATIC TRAIN PIPE CONNECTER LOCK

Application filed September 10, 1928, Serial No. 304,907. Renewed February 23, 1932.

In the now known types of automatic locks for train pipe connecters that are of a construction simplified to such an extent as to render them adaptable for practical use in the construction of cars making up a passenger train, latches or locking members that hold the connecter heads together do not exert a constant tendency or pull on the heads to cause their meeting faces to be constantly in engagement. This failure of a locking member to function as above noted has resulted in the creation of a condition wherein the locks do not properly engage should dirt or foreign particles be between the meeting faces on the heads.

In view of the foregoing, an object of this invention is to provide an automatic lock for train pipe connecters including a latching member with which are associated instrumentalities for so affecting the latching member that the latter constantly applies stress on the connecter head with which it is engaged in such manner as to pull mating connecter heads together.

In carrying out this idea more specifically, I avail of a spring which is properly positioned in the construction of the connecter so that the former when put under compression constantly affects the latch member to hold the same in a locking position. This spring is put under compression incident to the meeting of the mating connecter heads in a manner as will be hereinafter apparent, and provide in effect a yieldable linkage between said latch and the remainder of the construction of the connecter which automatically operates the latch. In providing this yieldable connection, the problem of positive action on unlocking operations of a latch immediately arises as practical usage of these connecters demands that the unlocking operation of the latch member be positive in every respect. In order to satisfy this condition and still provide the yielding connection above noted which is effective on locking actions of the latch member, I associate the spring with a link member which has a slip joint connection at one end with the latch member and a similar connection at the other with a connecting rod putting the same in operative relationship with respect to a buffer spring. This yieldable connection has the further advantage of constituting a wear take up means whereby wear in the meeting faces of mating connecters is accommodated.

With respect to the unlocking operations above noted, it is highly important that this operation take place at the right moment in advance of uncoupling of the connecter heads. In order to insure this action taking place at the proper moment, I propose by this invention to provide instrumentalities whereby the initiation of the unlocking action may be adjusted as desired. More particularly, an object in view is to provide at the slip joint between the link and connecter rod above mentioned, an adjustable abutment member which is engaged by a projection on the connecter rod to cause unlocking action on the part of the latching member, the relative position of this abutment member being the determining factor as to when this unlocking operation takes place.

With these and other objects in view such as the provision of an automatic lock of this type in which simplicity of construction, positiveness of operation, and excellency of efficiency have been emphasized, as will in part become apparent and in part be hereinafter stated, the invention comprises certain novel constructions, combinations, and arrangements of parts as will be subsequently specified and claimed.

For a full and more complete understanding of the invention, reference may be had to the following description and accompanying drawings, wherein—

Figure 1 is a view in side elevation of a train pipe connecter having an automatic lock made in accordance with this invention applied thereto, parts being broken away and shown in section to more clearly bring out certain details.

Figure 2 is a plan view of the connecter shown in Figure 1, parts being shown in section and parts in elevation, and Figure 3 is a transverse section taken about on the line 3—3 of Figure 1.

While a preferred specific embodiment of the invention is herein set forth, it is to be understood that I am not to be limited to the exact constructions illustrated and described because various modifications of these details may be provided in putting the invention into practice within the purview of the appended claims.

In the drawings a connecter head is indicated at A. This head is carried by a tubular member B mounted in an arm C in a manner to be hereinafter more fully developed. The arm C depends from a lug D of a car coupler in a well known manner. Needless to say the connecter head A is of the wing type. In this connection, it might be well to note that the automatic lock features might well be applied to connecters of other types, particularly those having the pin and funnel characteristics.

The arm or bracket C terminates at its lower end in a construction clearly shown in Figure 3 which develops an anchoring portion or device designated 1. The tubular hollow member B comprises spaced members 2 which are formed adjacent one end with a flanged portion 3 which under certain conditions abuts bracket C, and from this flanged portion 3 is a projecting neck portion 4. The bracket C is characterized in construction by the formation of the side lugs 5 which are located above and below the anchoring portion 1 and which are engaged by the flange portion 3 of the member B. Attention is directed to the flared construction of the members 2 shown at 6 and a reverse flare embodied in the construction of the bracket C supporting side lugs 5 as shown at 7.

A tie rod 8 has at one end an elongated opening 9 in which is located the anchoring device 1, the slot like formation permitting of a certain amount of play of the tie rod with respect to this anchoring device. A buffer spring 10 is located around the tie rod 8 and abuts at one end the flange portion 3 of the parts of the member 2, the spring receiving in its end the neck portion 4 and at its other end the nut member 11 which is formed with an enlarged flange portion 12.

The flange 3 is formed with an enlarged portion at one side thereof as shown at 13 in Figure 3 which portion is provided with a circular opening at 14 and with a non-circular opening at 15. The connecting rod 16 passes through the opening 14 and is bent over at one end to provide a depending portion 17 in which is an opening 18. The other end of the connecting rod 16 is fastened to a lug 19 extending from the edge of the portion 12 of the nut 11 and is positively fastened to this lug 19 by means of nuts 20. It might be well to note at this point that this connecter rod 16 also functions as a nut lock for the nut 11 because when this is affixed to the lug 19 in the manner above noted, rotation of the nut 11 is inhibited.

A bracket member 21 is threaded into the connecter head A as shown at 22 and is bent over at its outer end to provide an upstanding portion 23 which pivotally carries a latch member 24. This latch member 24 is held on the upstanding arm 23 of the bracket 21 by a pin and washer arrangement shown at 25. The latch member 24 is of a sort of bell crank formation with one arm terminating in a tapered faced head 26 which is designed to cooperate with an opening 27 in one of the wings of a mating connecter head. The other arm of the latch member 24 is provided with an opening shown at 28, and passing through this opening is a link 29 having an enlarged head as shown at 30 which engages the arm of the latch member 24 having the opening 28 therein. Threaded on the other end of the link member 29 is a nut 31 which is formed with a projection 32 that is complemental in shape to the non-circular opening 15 in the lug portion 13. This projection 32 is adapted to fit into the opening 15 so as to prevent any rotation of the said nut after the same has been properly adjusted.

It is notable that the link member 29 passes through the opening 18 in the turned over portion 17 of the connecter rod 16 and surrounding this link member 29 between the latch 24 and the connecter rod 16 is an expansion spring 33 which constantly exerts a force tending to spread apart member 17 and one arm of the latch 24. The operation and mode of functioning of my connecter lock may be described by assuming that the construction is in a position shown in Figure 1. When the mating connecter heads come together, the buffer spring 10 is compressed and the various instrumentalities assume the position as exemplified by Figure 2. The compressing of the buffer spring 10 through the connecter rod 16 has entailed a compression of the spring 33 which now affects latch member 24 to move the tapered faced head 26 into a locking position in the opening 27. Not only this, but the spring 29 constantly affects this latch member so that the head 26 exerts a pull on the wing member of the mating coupling head which action causes the meeting faces to be in proper engagement. Any wear on these meeting faces will be readily compensated for through the presence of the spring 33.

Upon the release of the buffer spring 10 through the uncoupling action, the connecter rod 16 is pulled in such a direction that the bent over portion 17 engages the nut 31 thereby imparting an unlocking operation through the link 29 to the latch member 24. It will be apparent that the point of initiation of this unlocking action may be changed by adjusting the position of the nut 31 on the link 29.

It is also to be noted that the point of contact of the latch head 26 with the connecter head A is only slightly to one side of the centre of the pivot point of the latch. This arrangement removes all objectionable rearward thrust on the springs 33 in the event the connecter heads try to open in service. A rigid joint at all times is thus secured.

Having thus described my invention, what I claim as new and desire to secure by Letters Patent of the United States, is

1. In an automatic lock for train pipe connecters of the class described, the combination with a connecter head, a bracket arm including an anchoring device, a tie rod and a buffer spring surrounding the tie rod and connected therewith and abutting a tubular member carrying the connecter head, of a locking member carried by the head, operative connections between the tie rod and the locking member including a connecting rod and a link member, a slip joint between the connecting rod and link member, and means for adjusting said slip joint whereby the time of action of the locking member by operation of the connecting rod may be adjusted as desired.

2. In an automatic lock for train pipe connecters of the class described, the combination with a connecter head carried by a hollow member, a bracket having an anchoring device, said hollow member being associated with the bracket, a tie rod fastened to the anchoring device and carrying at one end an abutment member, and a buffer spring interposed between the abutment member carried by the tie rod and the hollow member carrying the head, of a locking member pivotally carried by the connecter head, a link member operatively connected to said locking member, a connecting rod, a slip joint between said connecting rod and link member, said connecting rod being affixed to the abutment member for the buffer spring, and an expansion spring interposed between the connecting rod and the locking member.

3. An automatic lock for train pipe connecters of the class described, comprising, in combination, a bracket, a connecter head, a member having one end secured to said connecter head, the other end having a flanged portion adapted to abut said bracket and having apertures therein, a buffer for said member, a locking member for locking the connecter head to a mating head, and operating means therefor including a link and a connecting rod both of which are slidably received in the apertures in said flanged portion, the connecting rod being secured to the buffer.

4. An automatic lock for train pipe connecters of the class described, comprising, in combination, a bracket, a connecter head, a member having one end secured to said connecter head, the other end having a flanged portion adapted to abut said bracket and having apertures therein, a buffer for said member, a locking member for locking the connecter head to a mating head, and operating means therefor including a link and a connecting rod, a yieldable connection therebetween, both the link and the connecting rod being slidably received in the apertures in said flanged portion, the connecting rod being secured to the buffer.

5. An automatic lock for train pipe connecters of the class described, comprising, in combination, a connecter head, a support therefor, a locking member for locking the connecter head to a mating head, and operating instrumentalities for said locking member, said instrumentalities including a link connected to the locking member, an adjusting nut therefor, the adjusting nut being slidably and non-rotatably received by said support, a buffer for the locking member and a connecting rod secured to the buffer and link.

6. An automatic lock for train pipe connecters of the class described, comprising, in combination, a bracket, a connecter head, an elongated body member having one end carrying the conductor head and having its other end abutting the said bracket, the latter end being flared to form a seat for the said body against the said bracket, a buffer for the said body member comprising a rod, means for resiliently mounting the said rod, a locking member for locking the connecter head to a mating head, and operating means for the locking member.

7. An automatic lock for train pipe connecters of the class described, comprising, in combination, a bracket, a connecter head, a member having one end secured to the connecter head, the other end having a flanged portion adapted to abut the bracket and having apertures therein, a locking member for locking the connecter head to a mating head, and means carried by the member secured to the connecter head for operating the said locking member.

In testimony whereof I affix my signature.

JOSEPH ROBINSON.